United States Patent [19]

Imsand

[11] Patent Number: 4,723,159
[45] Date of Patent: Feb. 2, 1988

[54] THREE DIMENSIONAL TELEVISION AND VIDEO SYSTEMS

[76] Inventor: Donald J. Imsand, 308 Jonquil Ave., F. Walton Beach, Fla. 32548

[21] Appl. No.: 822,644

[22] Filed: Jan. 27, 1986

Related U.S. Application Data

[63] Continuation-in-part of Ser. No. 547,897, Nov. 2, 1983, Pat. No. 4,567,513, and a continuation-in-part of Ser. No. 613,790, May 24, 1984, Pat. No. 4,647,965.

[51] Int. Cl.[4] .......................................... H04N 13/00
[52] U.S. Cl. .................................... 358/88; 358/703; 358/92
[58] Field of Search ....................... 358/88, 91, 92, 89, 358/3, 229; 364/521, 522

[56] References Cited

U.S. PATENT DOCUMENTS

| | | | |
|---|---|---|---|
| 2,066,715 | 1/1937 | Centeno, V | 358/88 |
| 3,457,364 | 7/1969 | Carrillo | 358/3 |
| 3,564,133 | 2/1971 | Hobrough | 358/88 X |
| 3,621,214 | 11/1971 | Romney et al. | 364/522 |
| 3,636,551 | 1/1972 | Maguire | 358/88 X |
| 3,674,921 | 7/1972 | Goldsmith | 358/3 |
| 3,682,553 | 8/1972 | Kapany | 358/88 X |
| 3,818,125 | 6/1974 | Butterfield | 358/92 X |
| 3,878,329 | 4/1975 | Brown | 358/88 |
| 3,943,279 | 3/1976 | Austefjord | 358/88 X |
| 4,006,291 | 2/1977 | Imsand | 358/92 |
| 4,399,456 | 8/1983 | Zalm | 358/92 |
| 4,429,328 | 1/1984 | Jones, Jr. et al. | 358/88 |
| 4,489,389 | 12/1984 | Beckwith et al. | 364/522 |
| 4,506,296 | 3/1985 | Marraud et al. | 358/88 |
| 4,525,858 | 6/1985 | Cline et al. | 364/522 X |
| 4,558,359 | 12/1985 | Kuperman et al. | 358/89 |
| 4,567,513 | 1/1986 | Imsand | 358/92 |

FOREIGN PATENT DOCUMENTS

| | | | |
|---|---|---|---|
| 1066418 | 10/1959 | Fed. Rep. of Germany | 358/88 |
| 0037993 | 3/1982 | Japan | 358/88 |
| 0145291 | 8/1983 | Japan | 358/88 |

OTHER PUBLICATIONS

"A Real Time Stereoscopic Small–Computer Graphics Display System", Plott et al., IEEE Transactions, vol. 5, Sep. 1975.
"Mini–Computer Control of a Stereo Graphics Display", Willoughby et al., Journal of Applied Crystallography, vol. 7, 1974, pp. 430–434.

Primary Examiner—James J. Groody
Assistant Examiner—Victor R. Kostak
Attorney, Agent, or Firm—Kilpatrick & Cody

[57] ABSTRACT

Methods and apparatus for producing improved three dimensional television and video images which may be displayed on conventional display apparatus utilizing dynamic disparity techniques together with global convergence processing to remove objectional centroid disparity motion. Layered video and digital computer processing techniques are disclosed. In a preferred embodiment, a first camera scanning a foreground object rotates about a second fixed camera directed at background scenery. The obtained video data is computer processed using the above techniques, resulting in improved three-dimensional display.

18 Claims, 12 Drawing Figures

FIGURE 1A

FIG. 1B — SUPERIMPOSED RETINAL IMAGES WITH EYES CONVERGED ON OBJECT F

FIG. 1C — SUPERIMPOSED RETINAL IMAGES WITH EYES CONVERGED ON OBJECT B

FIG. 1D — IMAGES RECONSTRUCTED FOR CONVERGENCE OF BOTH OBJECTS

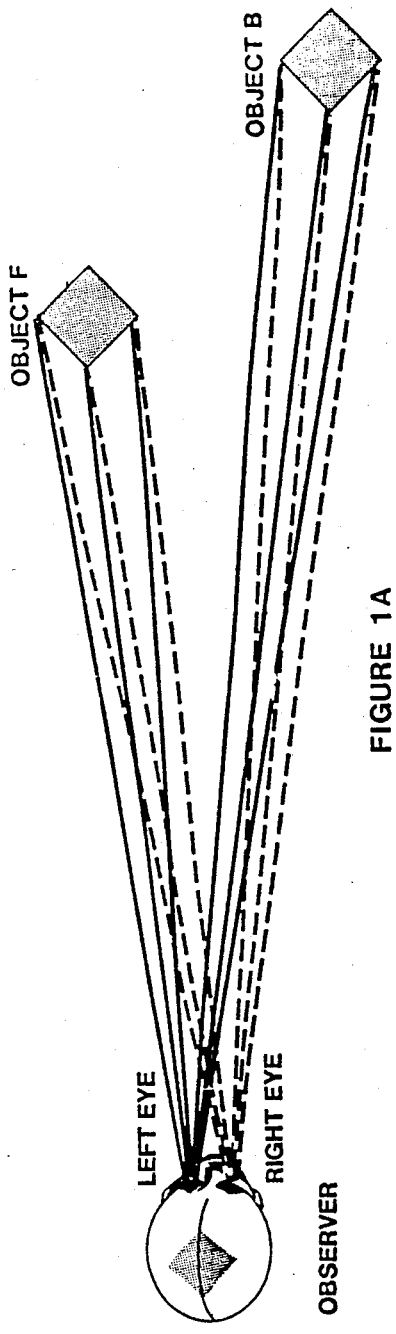
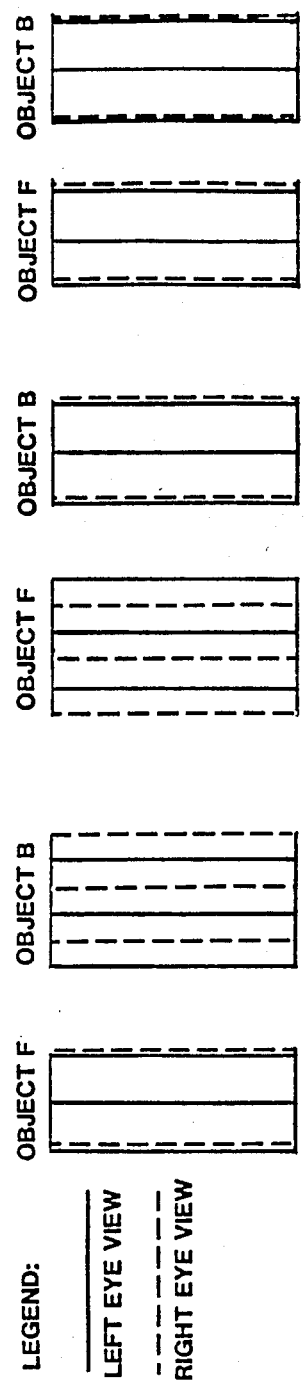
FIGURE 1

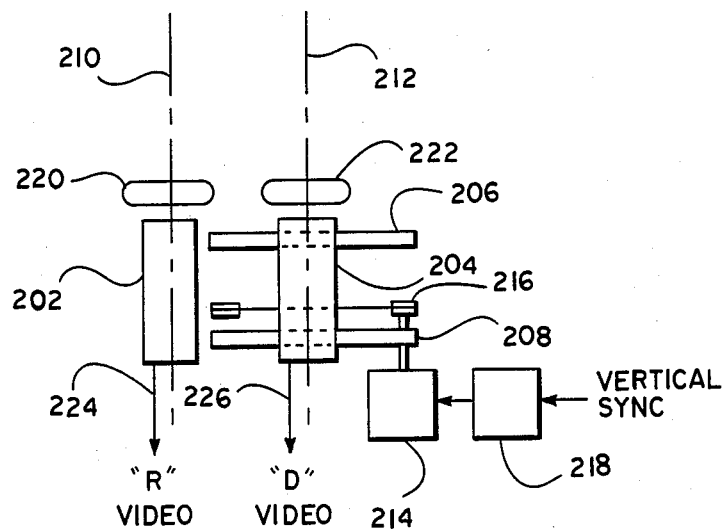
Fig_2
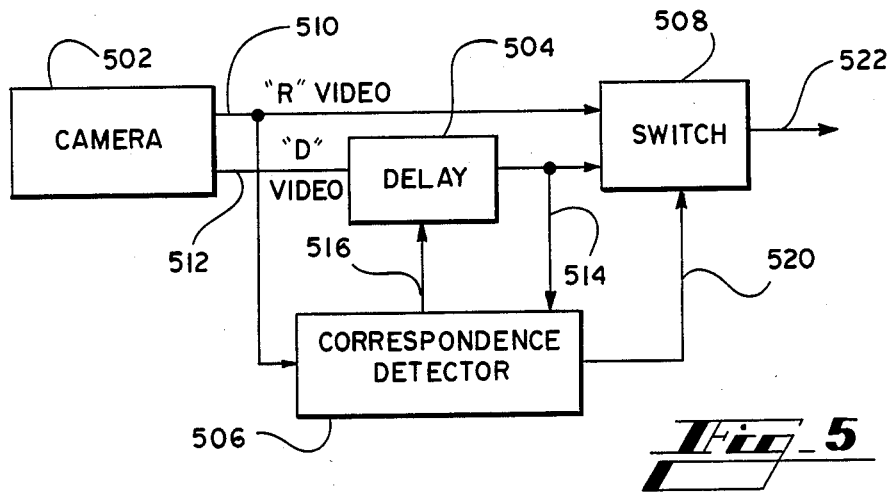
Fig_5

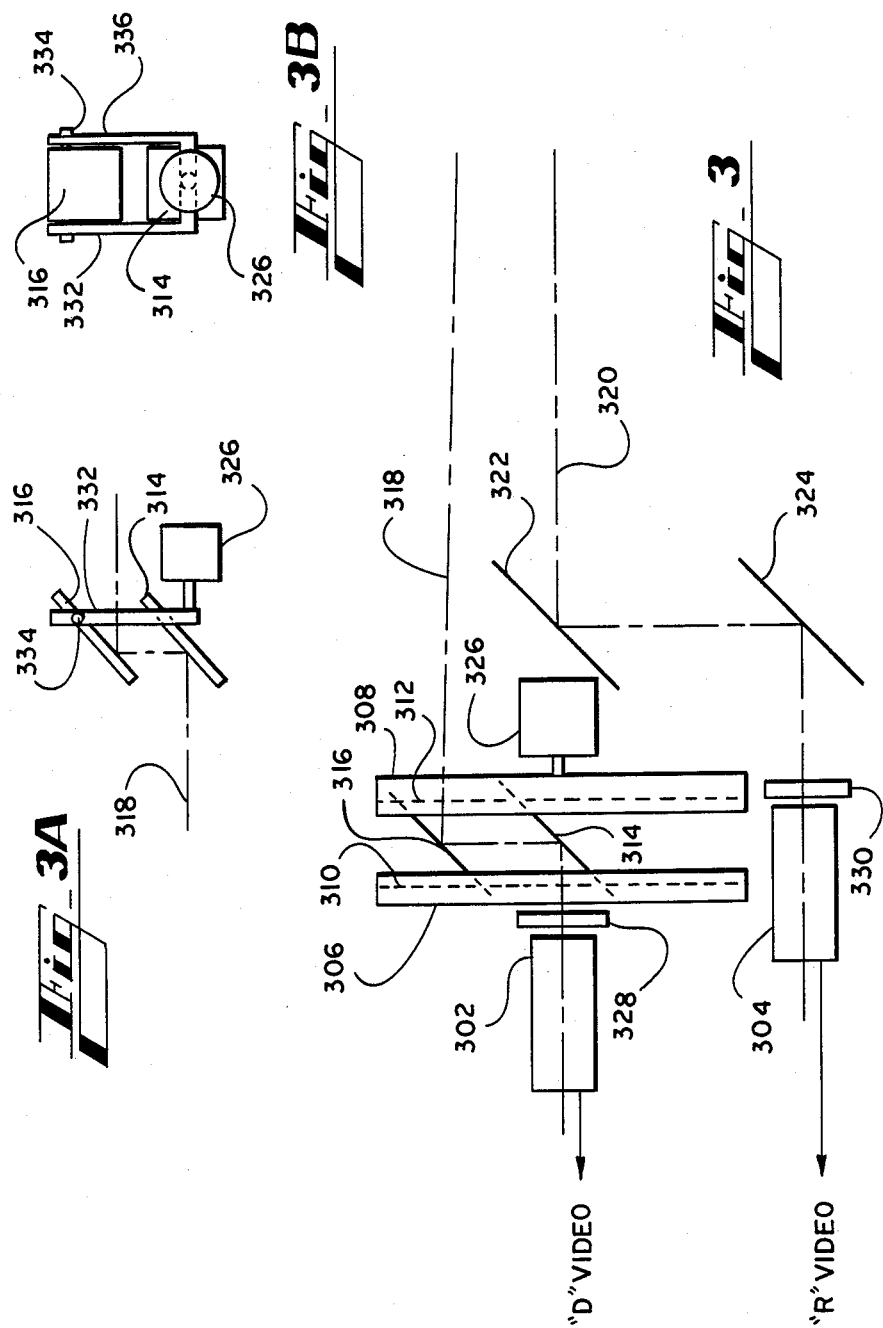

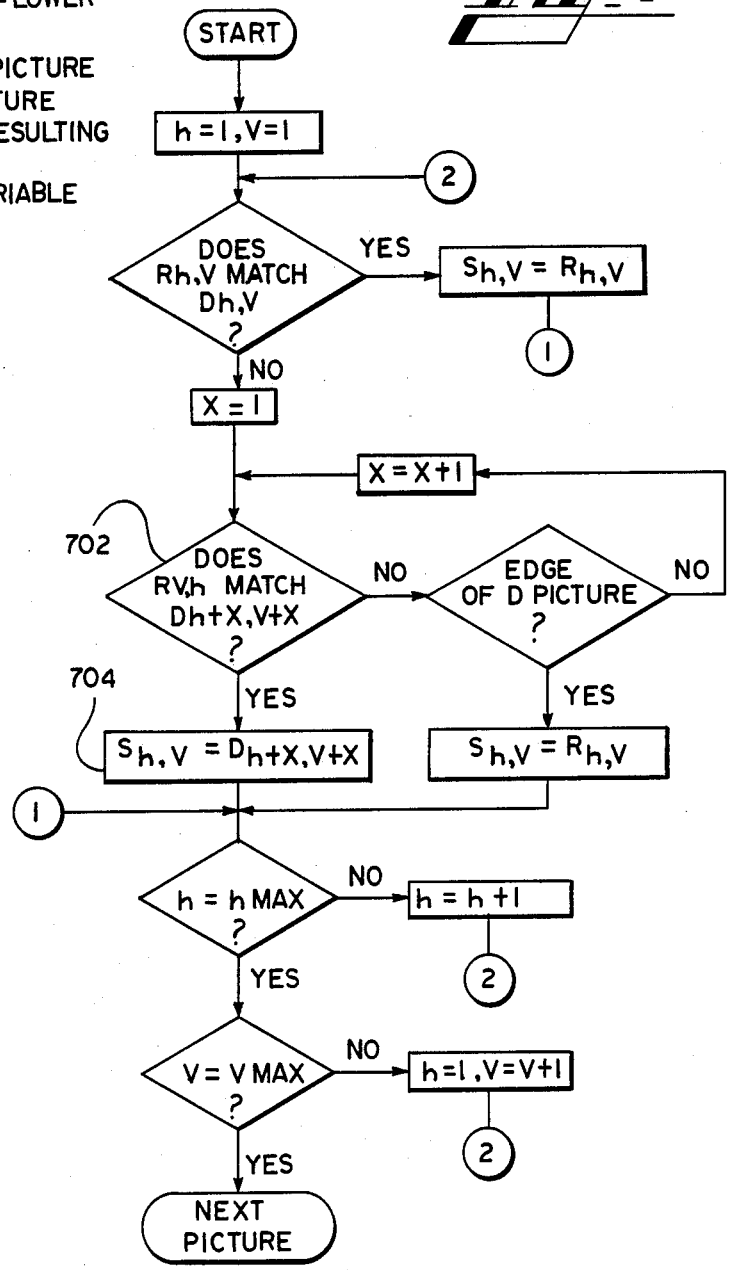

THREE DIMENSIONAL TELEVISION AND VIDEO SYSTEMS

This application is continuation-in-part of my co-pending application Ser. No. 06/547,897, filed Nov. 2, 1983 for a THREE DIMENSIONAL TELEVISION SYSTEM, now U.S Pat. No. 4,567,513 and my co-pending application Ser. No. 06/613,790, filed May 24, 1984 for a PICTURE PROCESSING SYSTEM FOR THREE DIMENSIONAL MOVIES AND VIDEO SYSTEMS, now U.S. Pat. No. 4,647,965, both of which applications are incorporated herein in their entirety by reference.

BACKGROUND OF THE INVENTION

This invention relates to methods and apparatus to enhance and increase the three dimensional ("3D") effects of three dimensional television systems, three dimensional motion pictures, and other display systems.

In my patent application Ser. No. 66,722 filed Aug. 25, 1970, I described a method for producing a three dimensional ("3D") image by the time domain alternation of stereoscopic images. In that application and application Ser. No. 308,209 filed Nov. 20, 1972, both of which are incorporated herein by reference, I also described a 3D television system that produces a 3D effect while maintaining compatibility with existing TV systems without requiring special glasses or other special viewer apparatus. In my patent application Ser. No. 06/547,897 I introduced the concept of global convergence and global convergence processing. In my application Ser. No. 06/613,790 I further disclosed computer based global convergence processing and its application to 3D motion pictures. These earlier applications discussed the theoretical basis for those inventions, and reference to them will provide more complete background information, some of which is also presented below.

ELEMENTS OF DEPTH PERCEPTION

Human binocular visual perception of three dimensions requires, in part, stereo images, one image corresponding to each eye, viewed from slightly different angles corresponding to the separation of the eyes. This causes each eye to see a slightly different image. Consequently, most three dimensional motion picture and television systems require the viewer to use some apparatus such as polarized glasses, color filter glasses or a mechanical shutter viewer in order to cause the left camera image to be viewed by the left eye and right camera image to be viewed by the right eye.

However, a less obvious method is to simply alternately expose the two stereo images to both eyes of the viewer. The three dimensional illusion is produced by presenting stereopticon pairs of images to both the viewer's eyes, one image partner at a time, first one then the other, alternated several times per second. The normal visual perception process, through its significant adaptive and integrating capabilities and the physiology of the visual perception process, will interpret the images as a single three dimensional image, so long as the images are alternated such that binocular fusion can take place.

The first paragraph of this section implies that 3D movies or television require the stereo cameras to be horizontally seperated corresponding to the horizontal seperation the eyes, but that is not completely accurate. Experiments indicate that the two cameras can be vertically (or diagonally) separated and still achieve the depth illusion. This result is implied by tilting one's head to the side while viewing a 3D movie; a stereopticon depth effect is still present even with the head tilted a full 90 degrees.

In addition, under many conditions, the human visual perception system does not care which eye sees which image, left or right. As long as there is a disparity in the two images and as long as the two images are within some range of corresponding binocular positions, a correct depth relationship will be perceived. This can be illustrated with a toy 3D viewer. Consider a stereo picture pair that includes several people pictured at various distances. If the two pictures are cut out, interchanged and viewed so that the left eye sees the right picture and the right eye the left picture, a correct spatial positioning of the people is still perceived. The picture may be uncomfortable to view but the depth illusion is still present.

Convergence

When an object is at a great distance, lines of fixation to the object from a viewer's separate eyes are nearly parallel. When the object is near, the viewer's eyes are turned toward the object and the fixation lines converge at a larger angle. If a person fixates his eyes on his finger at arm's length and then moves his finger in toward his nose while maintaining the fixation with his eyes, the eyes will "cross." This crossing or "pointing in" of the eyes may be detectable by the sensory control system that controls the position of the eyeballs, and it has be suggested that this produces a sensation of more depth or less depth according to the size of the convergence angle of the eyes. However, visual perception scientists generally agree that convergence is a relatively minor cue to depth perception. A much more important result of convergence is that it serves to place the two right and left eye images of the object fixated upon at (very nearly) corresponding retinal points in the central retinal area of each eye.

Stereoscopic Vision

When a person looks at an object, the retinal image in the right eye is different (disparate) from the retinal image in the left eye. This disparity is the result of the two eyes viewing the object from the two slightly different positions. Experiments have shown that the human visual perception system is highly sensitive to the disparity of the two retinal images. The visual perception system uses the amount of disparity as a measure of the depth of the object being viewed with increasing disparity being perceived as the object being closer. No disparity is perceived as a far background object. Studies of visual perception have shown that this stereoscopic vision phenomenon is a much more important cue to depth perception than convergence.

Binocular Fusion

When an object is viewed by the two eyes, although the two retinal images may be different, only a single image is normally perceived. This phenomenal process by which the two disparate images are merged into one and which takes place in the visual cortex of the sensory system is known as binocular fusion

Limit of Binocular Fusion

When the two eyes are converged on an object several feet away, two slightly different images will be viewed by the two eyes, but only one binocularly fused image will be perceived. If a second object is immediately beside the first object, it also will be perceived as a binocularly fused image. If the eyes remain fixated (converged) on the first object and the second object is moved further away into the background, a simple geometric projection analysis (see FIGS. 1A and 1B) will show that the difference in retinal correspondence in the retinal images of the background object will increase. When the difference gets large enough, the sensory system can no longer binocularly fuse the object and a double image will be perceived. When this occurs, the limit of binocular fusion has been reached. This is discussed as "Panum's limiting case" in Chapter 5 of Murch, G. M., Visual and Auditory Perception, Bobbs-Merrill Company, 1973, which is incorporated herein by reference. When the eyes are sighted and fixated on the background object, the background object will again become binocularly fused and the foreground object will become the double image (see FIGS. 1A and 1C).

Texture Disparity and Centroid Disparity

The modest differences in the two eye images of a single object that are caused by viewing the object from the two different positions of the eyes are referred to herein as texture disparities. When two objects at different distances from the viewer are viewed, the two views may contain much larger disparities that are referred to herein as centroid disparities. Although these two classes of disparities may have the same basic cause, the difference in magnitude is significant. The texture disparities are usually within the limit of binocular fusion and are thus resolved and merged by the visual cortex. However, centroid disparities may not be resolvable by the visual cortex. It is the function of the eye convergence system to remove or reduce the centroid disparities of the object of attention so that the visual cortex can resolve and merge the resulting texture disparities.

It is not the intent here to say that the vision system does not measure depth through centroid disparities. To the contrary, many experiments have been designed that contain only small centroid disparities and no texture differences. Dot patterns that contain no texture have been utilized to prove that depth perception is obtained from centroid disparities, when the centroid disparities are small. If the centroid differences are increased to exceed the limit of binocular fusion, no depth information is perceived, only a double image results. In this case, it does matter which eye sees which image. If the left dot pattern is viewed by the right eye and the other by the left eye, what was a foreground dot with normal viewing will now be perceived as a background dot.

Accommodation and Binocular Accommodation

In real life, the viewer is not normally aware of a double image even though it may be present in most complex scenes. This is because when the eyes are converged on the foreground object they are also focused on that object and the double image of the background object is out of focus and is autonomously de-emphasized via the accommodation property of the visual perception process. Some texts indicate that accommodation is (only) the focusing of the eye lenses. However, a de-emphasis process, herein referred to as binocular accommodation, that autonomously takes place in the visual cortex also causes the viewer to be unaware of the double image.

The interaction of convergence and binocular fusion in binocular depth perception is recognized in visual perception literature as a complex process (refer to Julez, B., Foundations of Cyclopean Perception, University of Chicago Press, 1971, for additional discussion). However, the following simplifications are consistent with visual perception literature and are pertinent to the present invention:

1. The visual perception system controls eye convergence in a manner that tends to maximize the correlation (or retinal correspondence) of the left and right eye images of the object of attention within some central portion of the retina. This process is mechanized by a feedback control system, with the error signal being generated from a correlation detection in the visual cortex that is fed back to control eye convergence so that the two left and right visual centroids of the object of attention nearly coincide.

2. The resulting two texturally disparate images are processed by the visual cortex to determine (relative) depth by measuring the disparities and to resolve the disparities, merging the two images into a single perceived image.

3. While corresponding object images that are within the limit of binocular fusion are merged into a single perceived image, corresponding object images that are not within the limit of binocular fusion are autonomously de-emphasized within the visual cortex via the binocular accommodation process.

Static Disparity and Dynamic Disparity

Previously discussed experiments illustrate that under many conditions, depth is perceived when the left eye views a right picture while the right eye views a left picture. It has also been observed that alternating stereo image display systems provide the depth illusion even when the cameras are vertically or diagonally separated. These alternating binocular display systems also provide a depth illusion when viewed with a single eye. This phenomenon provides a clue that there exists a mechanism similar to binocular stereopsis that is implemented in the visual perception system with monocular vision. This conclusion can be further supported with the following experiment. When observing a three dimensional scene, alternately observe the scene with one eye and with two eyes to observe the depth sensation provided by binocular vision. Then observe the scene with one eye but move the head slowly up and down or side to side. Observe that the dynamic disparity caused by the head motion also provides a depth sensation in the scene very similar to the sensation caused by the static disparity of binocular vision—not just the conscious thought effort of observing the parallax motion but also an autonomous sensation brought about by dynamic disparity conditions that are resolved in the visual cortex to measure depth.

Global Convergence Processing

Global convergence processing is processing of stereoscopic (or multiscopic) partner images in which the gross centroid disparities that are outside the limit of binocular fusion are removed or reduced while the texture disparities are retained. Global convergence processing may be accomplished by electronic or digital computer processing techniques.

NEED FOR DEPTH ENHANCEMENT

In 3D systems utilizing time domain alternation of binocular images, the two disparate images are alternated at such a rate that some retinal receptors discharge to the visual cortex under the influence of one image, while corresponding retinal receptors in the other eye discharge to the visual cortex under the influence of the other image. This allows the binocular rivalry of stereopsis to take place. It provides an excellent depth illusion, but the amount of depth illusion achieved may be less than that achieved with 3D systems that are based on binocular isolation. (Binocular isolation as used herein, refers to stereoscopic display systems in which one eye is allowed to see only one image while the other eye sees only the stereo partner image; for example, 3D motion pictures that utilize polarized glasses). Techniques that increase the amount of the depth effect will thus provide an improvement in many 3D display systems.

The use of motion (or dynamic disparity) to enhance the illusion of depth has been well known for years. Carrillo disclosed a camera motion device in his U.S. Pat. No. 3,457,364. However, such motion devices usually cause too much relative motion between foreground and background objects.

SUMMARY OF THE INVENTION

In the present invention dynamic disparity techniques are combined with global convergence processing techniques to remove harsh, objectionable centroid disparity motion while retaining the continuously changing texture disparities that increase the amount of binocular rivalry and produce dynamic disparity cues to enhance the depth effect in 3D television and video images.

If a camera is moved linearly from left to right (or up and down) or in a small circle while pointed at a single point (a far background point, for example), it will produce a dynamic disparity that will cause a depth illusion. The relative motion between foreground and background objects may be objectionable, but this can be corrected by global convergence processing techniques in accordance with the present invention.

When a TV camera is moved in such a manner, the resulting picture displayed on a TV monitor would appear to move, with individual objects closer to the camera appearing to move more than objects behind them. However, far background objects would appear to move very little or not at all, since the camera is constrained to continuously point at a far background object. Those objects that move noticeable amounts, however, may be repositioned to the corresponding positions in a picture from a fixed reference camera, by utilizing the methods of global convergence processing disclosed in my previous patent applications, now U.S. Pat. Nos. 4,567,513 and 4,647,965. This preserves and increases the texture disparities necessary for the depth illusion while removing the objectionable motion cause by centroid disparities.

Camera rotations or oscillations of about four cycles per second provide an excellent depth illusion, but slower or faster schemes - vertical only, horizontal only, diagonal, circular, elliptical or irregular - provide good depth illusion results. It is not necessary that the camera move very far; a total distance equal to or less than the eye separation distance will give good results (camera optics may increase or decrease the amount of movement necessary for best results).

It is thus an object of the present invention is to combine these motion depth enhancement techniques with global convergence processing techniques in order to achieve improved three-dimentional illusions in television and video images.

A preferred method of practicing the present invention is to utilize a circular motion camera in combination with the global convergence processing technique "Layered Video Technique" in my patent application Ser. No. 06,/547,897, U.S. Pat. No. 4,567,513. In this implementation, a single camera mounted in a circular motion device is pointed at a foreground object. The foreground object is contrasted against a solid color background. A second fixed camera is pointed at other background scenery. Video signals ("videos") from the two cameras are combined via a chroma detector device (sensitive to the solid color of the motion camera background) wherein the solid color background video from the motion camera is replaced by the background video from the fixed camera. Thus, the resulting background remains fixed while the foreground has a continuously changing texture to produce the depth effect.

Another preferred method to implement the present invention is to use a central, fixed "reference" camera and a second rotating camera (or rotating mirror assembly) in conjunction with a digital computer based image processing system. Two pictures are first digitized, one from the central fixed camera and one from the rotating camera. Next the corresponding elements and corresponding object images in the two pictures are identified through digital computer picture processing techniques, as discussed in my patent application Ser. No. 06/613,790 U.S. Pat. No. 4,647,965. Then object images in the reference picture are replaced by the corresponding object images from the rotating camera picture. This is repeated for each sequential pair of pictures. In the resulting sequence of pictures, each object in the pictures is in the position captured by the fixed reference camera, but each object has the continuously changing texture captured by the motion camera. This implementation works very well for dynamic scenery, where individual objects are moving.

Another preferred method is to use the rotating camera system or rotating mirror assembly described in the previous paragraph (fixed reference camera and rotating camera) in combination with the global convergence processing techniques that are described in my patent application Ser. No. 06/547,897, U.S. Pat. No. 4,567,513 as "Correspondence Detection and Convergence Processing Techniques."

BRIEF DESCRIPTION OF THE DRAWINGS

FIGS. 1A-1C are drawings illustrating the geometry of binocular vision, while FIG 1D illustrates the concept of global convergence.

FIG. 2 is a schematic diagram of a video pickup device and assembly to implement a linear motion camera assembly.

FIG. 3 is a schematic diagram of video pickup devices and a mirror assembly to implement a circular motion camera assembly.

FIGS. 3A and 3B are side and front elevational schematic views of an alternative embodiment of the mirror assembly portion of the video pickup device of FIG. 3.

FIG. 5 is a block diagram of a correspondence detector and video processor implementation of a one embodiment of the present invention.

FIG. 7 is a flowchart of software usable to practice the digital computer implementation of the present invention illustrated in FIG. 6.

DETAILED DESCRIPTION OF THE DRAWINGS

Figure 4:
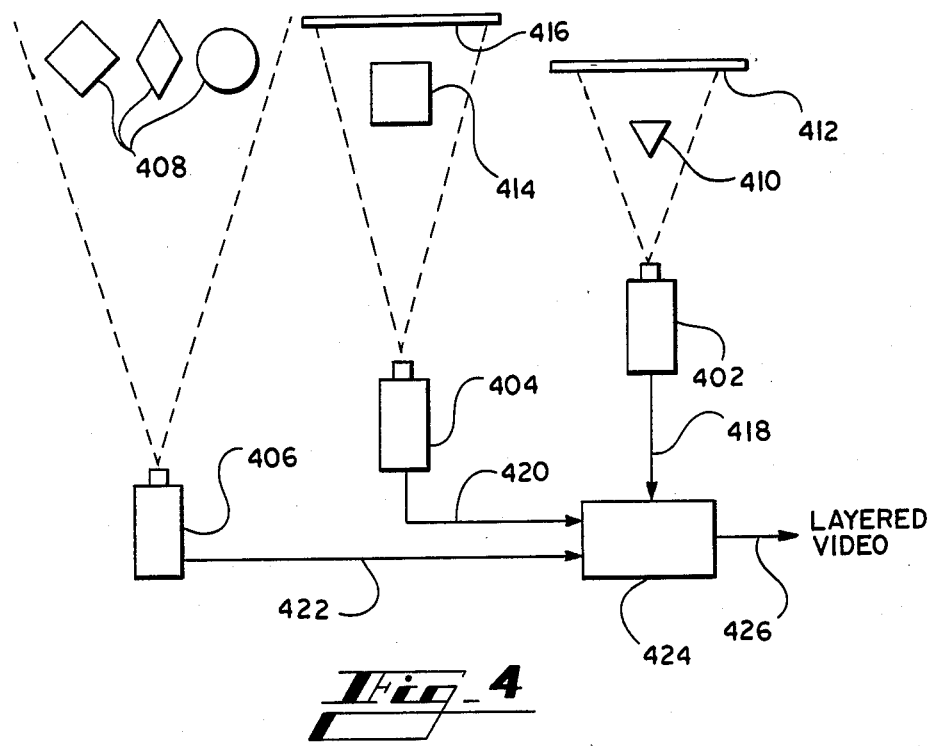
FIG. 4 is a schematic diagram of a system to practice the depth enhancement techniques of the present invention using layered video techniques.

FIG. 1A is a plan view diagram of a human observer and the lines of sight from each eye to a foreground object F and a background object B presented to assist in explaining the present invention.

FIG. 1B is a simplified illustration of the superimposed retinal images for the observer of FIG 1A when his eyes are converged on foreground object F.

FIG. 1C is a simplified illustration of the superimposed retinal images for the observer of FIG 1A when his eyes are converged on the background object B.

FIG. 1D is a simplified illustration of the superimposed retinal images when the video has been processed in accordance with global convergence processing techniques, thus allowing binocular fusion of both objects.

Dynamic Disparity Camera Implementations

FIG. 2 is an illustration of a linear motion video camera assembly in accordance with the present invention. A fixed (reference) camera pickup tube 202 and moving camera pickup tube 204 photograph the scene along view centerlines 210 and 212. The moving pickup tube 202 slides along tracks 206 and 208, propelled by stepper motor 214 and belt assembly 216. Preferably, control assembly 218 controls the stepper motor to move the camera pickup tube 204 during the vertical blanking period. Optics assemblies 220 and 222 include shutters which close off light to the pickup tubes while pickup tube 204 is moving. Both pickup devices 202 and 204 simultaneously collect video images. The resulting video images are a fixed or reference picture video 224 (R) of the scene and a continuously changing (dynamic disparity) video 226 (D) from the moving camera. As previously stated, video from foreground objects will move in the D video picture while video from background objects is relatively fixed. It should also be noted that in the D video the centroid of the nearer video objects, as well as the texture disparities, will be changing as the pickup tube 204 moves.

The implementation of the present invention illustrated in FIG. 3 is similar to the implementation of FIG. 2, except the motion camera is moved in a circular (or elliptical) pattern. In FIG. 3, pickup device 304 serves as the fixed or reference picture source and pickup device 302 is the dynamic motion pickup device. Mirrors 314 and 316 are rotated in circular (or elliptical) tracks 306 and 308 by stepper motor 326. The mirrors are supported by brackets 310 and 312 that slide in the circular tracks. Thus, view centerline 318 continuously rotates about fixed view centerline 320. Note that mirror 316 includes a means (not shown) for angle adjustment so that view centerline 318 can intersect view centerline 320 at any desired distance from the camera.

Lens and shutter assemblies 328 and 330 serve the same purpose as described above in connection with FIG. 2. Again, synchronizing and control circuitry also not illustrated is provided to step the stepper motor 326 during the video vertical blanking period.

FIGS. 3A and 3B show an alternative embodiment of the rotating mirror mechanism of FIG. 3. A U-shaped bracket 332 rotated by stepping motor 326 captures mirrors 314 and 316 between upright arms 336. Mirror 314 may typically be fixed at an angle 45° to the axis of camera 302, and mirror 316 is adjustable by means of adjustment mechanism 334 to permit adjustment of viewline 318.

The implementation of the present invention illustrated in FIG. 3 can also be practiced by rotating the picture pickup device instead of using a rotating mirror assembly. Obviously, both the FIG. 2 and FIG. 3 implementations could also be implemented with appropriately positioned multiple picture pickup devices instead of a single moving pickup device which moves to several positions.

In the descriptions herein, the D and R videos are intended to be representative of various video schemes and may represent monochrome video, composite color video or three line red, green and blue (RGB) video.

Layered Video Techniques Implementations

The dynamic disparity cameras of FIGS. 2 and 3 can be utilized to implement layered video techniques with enhanced depth effects. The may be accomplished utilizing methods similar to the "Layered Video Techniques" described in my patent application Ser. No. 06/547,897 U.S. Pat. No. 4,567,513, except that a dynamic disparity camera of the type described above is utilized instead of the stereo cameras 1312 and 1314 and electronic switch 1332 of FIG. 13 of the previous application. Such an implementation is shown in FIG. 4 herein. Cameras 402 and 404 are dynamic disparity cameras as described in connection with FIGS. 2 and 3, except that only the D video and pickup assembly need be utilized for layered video implementations. Camera 406 is a normal video camera focused on desirable background scenery 408. Camera 402 is focused on a foreground object 410 against a solid color background 412. Camera 404 is focused on a midground object 414 against a solid color background 416. The cameras are genlocked together. The genlocked videos from the cameras are accepted by signal combiner 424, which detects the solid color video of background 416 and substitutes the video from camera 406 and also detects the solid color background 412 and substitutes the previously combined videos in a resulting single layered video signal 426. Signal combiner 424 may typically be a Panasonic WJ-5600 special effects generator available from Panasonic Industrial Company, division of Matsushita Electric Corporation of America, One Panasonic Way, Secaucus, N.J. 07094. This resulting video signal 426 contains the background video of camera 406 and the midground video of camera 404 and the foreground video of camera 402 with the continuously changing texture of the foreground object and the midground object to enhance the depth effect. Note that to minimize centroid motion of the foreground object 410 and the midground object 414, the mirror 316 of FIG. 3 (when a FIG. 3 type apparation in utilized) is adjusted so that view centerlines 318 and 320 cross at the foreground object 410 and the midground object 414.

Convergence Processing Techniques Implementations

Convergence processing techniques maybe used to practice the present invention in a manner similar to the methods described in the section entitled "Convergence Processing Techniques" in my patent application Ser. No. 06/547,897 U.S. Pat. No. 4,567,513 except that the dynamic disparity cameras of FIGS. 2 or 3 above are utilized instead of the stereo cameras described in the previous application Ser. No. 06/547,897. In practicing this technique, the foreground (and midground) object videos in the R video (of FIG. 2 or 3) are replaced by the corresponding object videos from the D video. In order to accomplish this, the two videos are processed by correspondence detection circuitry and by convergence processing techniques as described in my patent application Ser. No. 06/547,897. In the resulting video, the centroid positions of video objects in the scene are moving very little or not at all, but the texture disparities of foreground and midground objects are continuously changing, thus providing an enhanced depth effect.

A preferred implementation utilizing the camera apparatus of FIG. 2 with correspondence detection circuitry may be implemented as follows. With the view centerlines 210 and 212 converged at a far background point, D video from foreground (or midground) objects will always occur before the corresponding R video (for left to right scan video pickup devices and the R device on the left side). Referring to FIG. 5, camera 502 is a camera of the FIG. 2 configuration. The R video 510 from camera 502 is connected to video switch 508. The D video 512 from 502 passes through controllable delay device 504. Correspondence detection device 506 contains circuitry that accepts and compares the R video 510 and delayed D video 514. The device 506 circuitry also controls the delay device 504 with signal 516 and switch 508 with signal 520. Device 506 controls the delay 504 and video switch 508 as follows: (1) Initially, the delay is zero. As long as the R video and D video correspond, switch 508 passes R video 510. (2) When the R and D video do not correspond, R video is passed and the D video 512 is delayed until the delayed D video 514 corresponds with the R video 510. (3) The D video 514 is then passed until the delayed D video and the R video no longer correspond. (4) When the delayed D video 514 and the R video no longer correspond, the switch begins passing R video and the memory of the delay device 504 is dumped and undelayed D video is again passed by delay device 504. (5) Undelayed D video is compared with R video and the sequence from step (1) is repeated until the horizontal scan line is completed.

Video signals do not necessarily have to be equal to correspond. If they are within some threshold (for example, within 0.5 percent of full scale) of equality, they may be declared corresponding signals. In the case of an RGB system, if red and green and blue are each within a threshold of being equal to the corresponding color signal in the second signal, they may be declared corresponding signals. Refer to patent application Ser. No. 06/547,897, U.S. Pat. No. 4,561,513 for additional discussion of correspondence.

The above implementation can also be adapted to the camera of FIG. 3, but the delay, correspondence detection and control circuitry is more complicated. An implementation involving the FIG. 3 camera and a digital computer based image processing system will now be discussed. However, hardware as described above in the discussion of FIG. 5 can also be utilized to implement the algorithms of the computer based image processing described below.

Figure 6:
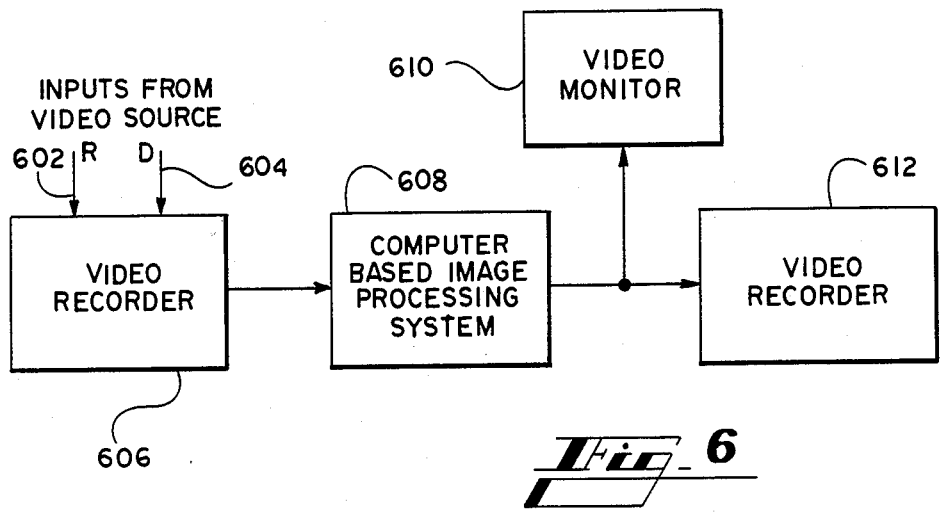
FIG. 6 is a block diagram of a digital computer system implementation of a second embodiment of the present invention.

The disparity camera of FIG. 3 and a digital computer based image processing system is, shown in FIG. 6. The video inputs 602 and 604 may be the R and D videos from the FIG. 3 camera. Video recorders 606 and 612 may be tape or disk recorders, as the application requires. Two pictures (R and D captured at the same time by the camera) are digitized and processed by the image processing system 608. In this image processing system 608, the corresponding object images in the two pictures are identified, and each foreground and midground object image in the R picture is replaced by its corresponding object image in the D picture. The processed picture is then converted to an analog form for display on the monitor 610 or is recorded on recorder 612 for subsequent transmission or display.

In the implementation illustrated in FIG. 6 utilizing the camera of FIG. 3, since the view point of the D pickup device moves in a circle about the R pickup device, a slightly different algorithm may be used for each D position. It can be assumed the D device moves to eight positions around the R device; to the right, right upper (45 degree diagonal), above, left upper, left, left lower, below and right lower, repetitively. With the view centerlines 318 and 320 of the camera of FIG. 3 converging on a far background object, when the D device is to the right of the R device, for a foreground object the D video will always occur before the corresponding R video but on the same horizontal scan line. When the D device is above the R device, for a foreground object the D video will always occur on a subsequent horizontal scan line but at the same position within the two scan lines. When the D device is to the upper right, foreground object D video will always be displaced to the left and below the corresponding object position in the R video. Because of this, it may be helpful (but not necessarily required) to identify D pictures by their positions relative to R pictures. This may be accomplished, for example, by electronically encoding this information during the vertical blanking period of the video. Alternatively, since the D pictures always occur in the same sequence, the first picture can be manually identified and then the full sequence is known. In this implementation, image processing software implements the following step by step procedure to achieve the object of the invention:

The R and D pictures will be combined to produce a single picture (designated S) as follows: (1) When the R and D pixels in corresponding positions also correspond (within a threshold) in color and intensity, utilize the R pixels in the resulting single picture S. (2) When the R and D pixels do not match in the above step, search the D picture for the pixel that matches the R pixel. Place the D pixel in the position of the R pixel but in the S picture. Use the D device location information to determine the search direction. Search only in the correct direction. (3) If matching pixels cannot be located (because the pixel is at the picture edge) use the R pixel in the S picture.

The flow diagram of FIG. 7 defines the software functions for this implementation. The D picture search pattern shown in blocks 702 and 704 is for when the D picture device of the camera is to the left and above the R picture device. The software for the other D device locations is the same except the D picture search pattern is in the appropriate direction.

To adapt this flow-chart to each of the eight search conditions, the search coordinates change as follows:

Assuming that the D picture device begins at the left and above the reference R device and progresses counter-clockwise (left, left below, below, right below, right, right above, above, and so forth), the search coordinates will sequence: h+x, v+x; h+x, v; h+x, v−x; h, v−x; h−x, v−x; h−x, v; h−x, v+x; h, v+x; and so forth.

A computer based image processing system 608 suitable for use in practicing the present invention as illustrated in FIG. 6 is the COMTAL/3M Vision Ten/24 Image Processing System (COMTAL/3M, 505 W. Woodbury Road, Altadena, Calif. 91001) in video configuration in accordance with the published COMTAL technical specifications and manuals for the COMTAL VISION TWO, VISION ONE/10, VISION ONE/20 and VISION TEN/24 Systems, which are incorporated herein by reference.

As will be readily understood by one skilled in the art, the foregoing disclosure is intended to illustrate and explain the invention. Numerous modifications and adaptations of the disclosed apparatus and techniques may be made without departing from the scope and spirit of the invention or the appended claims.

I claim:

1. A method of producing an improved three dimensional video image comprising the steps of:
   (a) positioning a camera having at least one picture pickup device to view a scene,
   (b) rapidly changing, in small increments, the viewline of the picture pickup device, and
   (c) reducing the apparent object motion induced by the picture pickup device viewline position changes by repositioning objects in the video image to reference positions.

2. The method in accordance with claim 1 further comprising the step of changing said pickup device viewline at a rate of approximately four cycles per second.

3. The method in accordance with claim 1 further comprising the step of making said incremental position changes in a linear direction.

4. The method in accordance with claim 1 further comprising the step of making said incremental position changes in the pattern of a closed curve.

5. The method in accordance with claim 1 further comprising the step of making said incremental position changes during the vertical interlace period of the video signal.

6. The method in accordance with claim 1 further comprising the step of establishing the reference positions by locating the viewline of a fixed picture pickup device close to the viewline of the moving picture pickup device.

7. A method for producing an improved three dimensional video image comprising the steps of:
   (a) separately producing changing video images of foreground objects positioned in front of a solid color background utilizing a camera having at least one picture pickup device with a viewline with a rapidly changing position, which camera is located approximately equal distances from the foreground objects;
   (b) separately producing changing video images of midground objects positioned in front of a solid color background utilizing a camera having at least one picture pickup device with a viewline with a rapidly changing position, which camera is located approximately equal distances from the midground objects;
   (c) separately producing monocular video of only background objects; and
   (d) combining the foreground, midground and background video images such that the solid color background of the midground video is replaced by corresponding portions of the monocular background video and the solid color background video of the foreground video is replaced by corresponding portions of the combined midground and background video.

8. A method for producing an improved three dimensional video image comprising the steps of:
   (a) positioning to view a scene a camera apparatus having a reference video picture pickup device and a dynamic disparity video picture pickup device having a viewline which rapidly changes;
   (b) measuring the characteristics of the video signals from the reference and dynamic disparity pickup devices;
   (c) comparing the characteristics and time occurrence of video elements within each of the two video signals;
   (d) identifying corresponding video elements within each of the two video signals;
   (e) processing the video signal from the dynamic disparity pickup device to time shift such elements to the position of corresponding elements in the reference pickup device video signal; and
   (f) displaying the processed dynamic disparity video signal.

9. The method of claim 9 further comprising the steps of:
   (a) comparing the reference and dynamic disparity video signals utilizing correspondence detection circuitry; and
   (b) processing the video signals utilizing convergence processing circuitry.

10. The method of claim 8 further comprising the step of identifying corresponding video elements and processing the dynamic disparity video signal utilizing a computer based image processing system.

11. An apparatus for producing an improved three dimensional video image comprising:
   (a) a camera having at least one picture pickup device,
   (b) a means for rapidly changing, in small increments, the view line of the picture pickup device, and
   (c) a means for reducing the apparent object motion induced by the picture pickup device viewline position changes by repositioning objects in the video image to reference positions.

12. The apparatus of claim 11 further comprising a reference pickup device and a means for adjusting the intersection point of the viewlines of said one picture pickup device and the reference pickup device.

13. The apparatus of claim 11 wherein said means for changing the viewline in small increments moves the viewline in a linear direction.

14. The apparatus of claim 11 wherein said means for changing the viewline in small increments moves the viewline in a closed curve.

15. An apparatus for producing an improved three dimensional video image comprising:

(a) a camera apparatus having a reference video picture pickup device and a dynamic disparity video picture pickup device;

(b) a means for rapidly changing, in small increments, the viewline of the dynamic disparity picture pickup device; and (c) a means for reducing the apparent object motion induced by the picture pickup device viewline position changes by repositioning objects in the video image to reference postions.

16. The apparatus of claim 15 wherein said means for changing the viewline in small increments moves the viewline in a linear direction.

17. The apparatus of claim 15 wherein said means for changing the viewline in small increments moves the viewline in a closed curve.

18. An apparatus for providing stereoscopic images comprising:

(a) a camera appartus having a reference picture pickup device and a dynamic disparity picture pickup device;

(b) a means for rapidly changing the viewline of the dynamic disparity picture pickup device;

(c) a picture digitizing system for receiving images from the picture pickup devices and digitizing such images;

(d) a digital computer picture processing system for receiving the digitized images from the picture digitized system and processing such digital information by shifting corresponding object images in the dynamic disparity images to positions that more nearly coincide with those of like object images in the reference images;

(e) a digital to picture conversion system for receiving the processing digital data from the digital computer picture processing system and converting such data to analog image form; and (f) a stereo viewing system for receiving the analog image data from the digital picture conversion system and providing visible stereo images.

* * * * *